(12) United States Patent
Watanabe et al.

(10) Patent No.: US 10,740,906 B2
(45) Date of Patent: Aug. 11, 2020

(54) UNATTENDED OBJECT MONITORING DEVICE, UNATTENDED OBJECT MONITORING SYSTEM EQUIPPED WITH SAME, AND UNATTENDED OBJECT MONITORING METHOD

(71) Applicant: PANASONIC INTELLECTUAL PROPERTY MANAGEMENT CO., LTD., Osaka (JP)

(72) Inventors: Takeshi Watanabe, Kanagawa (JP); Ryuji Yamazaki, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 86 days.

(21) Appl. No.: 16/070,330

(22) PCT Filed: Nov. 7, 2016

(86) PCT No.: PCT/JP2016/004817
§ 371 (c)(1),
(2) Date: Jul. 16, 2018

(87) PCT Pub. No.: WO2017/130252
PCT Pub. Date: Aug. 3, 2017

(65) Prior Publication Data
US 2019/0019296 A1     Jan. 17, 2019

(30) Foreign Application Priority Data

Jan. 25, 2016 (JP) .................................. 2016-011835

(51) Int. Cl.
*G06T 7/20* (2017.01)
*G06T 7/254* (2017.01)
(Continued)

(52) U.S. Cl.
CPC ............ *G06T 7/20* (2013.01); *G06K 9/00771* (2013.01); *G06T 7/254* (2017.01); *H04N 7/183* (2013.01);
(Continued)

(58) Field of Classification Search
CPC . G06T 7/20; G06T 7/254; G06T 2207/30232; G06T 7/194; H04N 7/188;
(Continued)

(56) References Cited

U.S. PATENT DOCUMENTS

2010/0157089 A1\* 6/2010 Pakulski .............. G06K 9/3241
348/222.1
2010/0271478 A1\* 10/2010 Oya ........................ H04N 5/76
348/143
2016/0323536 A1   11/2016 Oya

FOREIGN PATENT DOCUMENTS

JP   01-245395   9/1989
JP   2010-258704   11/2010
(Continued)

OTHER PUBLICATIONS

Official Communication issued in International Pat. Appl. No. PCT/JP2016/004817, dated Jan. 10, 2017.
(Continued)

*Primary Examiner* — Marcos L Torres
(74) *Attorney, Agent, or Firm* — Greenblum & Bernstein, P.L.C.

(57) ABSTRACT

It is possible to provide a user with progress information of an unattended object after the appearance in a monitoring area. An unattended object monitoring device is configured to include an image acquirer that acquires a captured image of the monitoring area imaged by the imaging device, an object tracker that detects an object appearing in the monitoring area from the captured image and tracks between the
(Continued)

captured images for each appearing object, an unattended object detector that detects an appearing object not displaced beyond a predetermined time as an unattended object based on a tracking result for each appearing object, a progress information generator that generates progress information of the unattended object after the appearance in monitoring area based on the tracking result for each appearing object, and a notification image generator that generates notification image by superimposing the progress information on the captured image.

7 Claims, 11 Drawing Sheets

(51) Int. Cl.
*G06K 9/00* (2006.01)
*H04N 7/18* (2006.01)
*G08B 21/04* (2006.01)
*G06K 9/32* (2006.01)
*G06T 7/194* (2017.01)
*H04N 5/272* (2006.01)
*H04N 9/64* (2006.01)

(52) U.S. Cl.
CPC ..... *H04N 7/188* (2013.01); *G06K 2009/3291* (2013.01); *G06T 7/194* (2017.01); *G06T 2207/30232* (2013.01); *G08B 21/043* (2013.01); *G08B 21/0476* (2013.01); *H04N 5/272* (2013.01); *H04N 9/64* (2013.01)

(58) Field of Classification Search
CPC .......... H04N 7/183; H04N 9/64; H04N 5/272; H04N 7/18; G06K 9/00771; G06K 2009/3291; G08B 21/0476; G08B 21/043; G08B 25/04; G08B 25/00
See application file for complete search history.

(56) References Cited

FOREIGN PATENT DOCUMENTS

| JP | 2011-049646 | 3/2011 |
|----|-------------|--------|
| JP | 2012-235300 | 11/2012 |

OTHER PUBLICATIONS

U.S. Appl. No. 16/063,101 to Takeshi Watanabe et al., which was filed on Jun. 15, 2018.

* cited by examiner

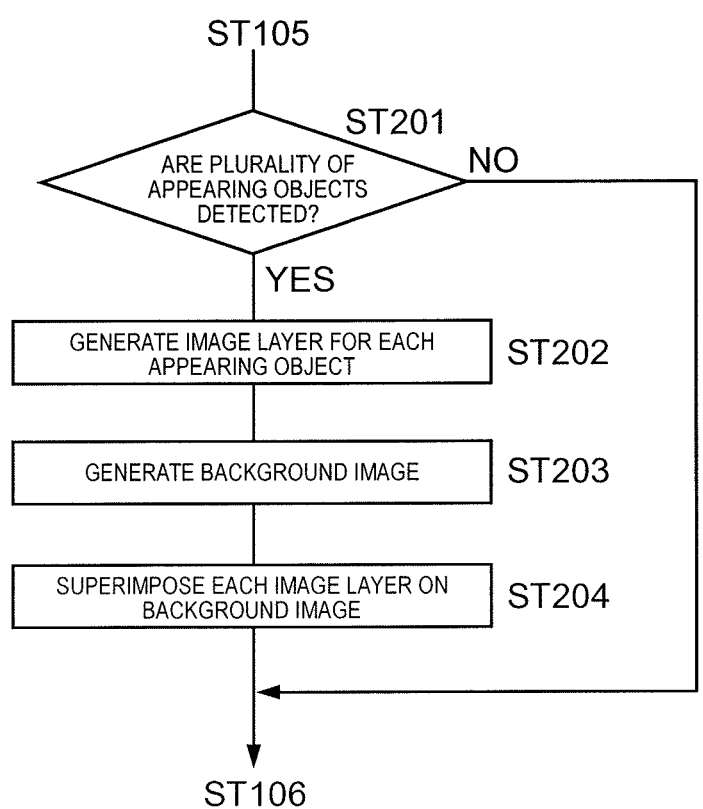

UNATTENDED OBJECT MONITORING DEVICE, UNATTENDED OBJECT MONITORING SYSTEM EQUIPPED WITH SAME, AND UNATTENDED OBJECT MONITORING METHOD

TECHNICAL FIELD

The present disclosure relates to an unattended object monitoring device that detects an unattended object left behind in a monitoring area based on captured images of the monitoring area imaged by an imaging device, an unattended object monitoring system equipped with the same, and an unattended object monitoring method.

BACKGROUND ART

In the related art, in a space such as stations, airports, and the like used by a large number of unspecified persons, monitoring of unattended suspicious objects has been performed for the purpose of crime prevention and the like. Monitoring of an unattended object is generally performed by an observer monitoring captured images of a monitoring area imaged by a monitoring camera (imaging device), but it is necessary to automatically detect an unattended object based on captured images of a monitoring area in order to reduce the burden on the observer and improve the accuracy of the detection of the unattended object. Therefore, various techniques for automatically detecting an unattended object based on captured images have been proposed (see PTL 1). In the technique in the related art of PTL 1, a difference between an input image of a monitoring target area captured and input at a predetermined time interval and an initial image of the monitoring target area is obtained to cut out the image of a person in the monitoring target area, the person images successively obtained at the predetermined time interval are compared with each other to detect an object image to be separated from the person images, and when the object image is detected, the time for which the object image is left behind measured so that an alarm is issued when a predetermined time has elapsed.

In addition, in a case where an unattended object is detected, it is desirable to be able to specify the owner of the unattended object. Therefore, various techniques have been proposed for specifying the owner of an unattended object based on captured images (see PTL 2 and PTL 3). In the technique in the related art of PTL 2, an image of an unattended object and an image of a surrounding person within a predetermined distance range from the unattended object are extracted from a captured image, and log data including the image of the unattended object and the image of the surrounding person are extracted so as to provide a user with information for specifying the owner of the unattended object. In addition, in the technique in the related art of PTL 3, in a predetermined period with an end point just before the detection time at which an unattended object (suspicious object) is first detected, all the objects whose detection areas overlap with a detection area of the suspicious object are detected as a candidate object of the owner of the unattended object, and information (incident information) including an object image of the detected candidate object is output so as to provide the user with information for specifying the owner of the unattended object.

CITATION LIST

Patent Literature

PTL 1: Japanese Patent Unexamined Publication No. 1-245395

PTL 2: Japanese Patent Unexamined Publication No. 2012-235300

PTL 3: Japanese Patent Unexamined Publication No. 2011-49646

SUMMARY OF THE INVENTION

The unattended object monitoring device of the present disclosure is an unattended object monitoring device that detects an unattended object left behind in a monitoring area based on a captured image of the monitoring area imaged by an imaging device, including a processor, and a memory that stores an instruction, the device further comprising, as a configuration when the processor executes the instruction stored in the memory, an image acquirer that acquires a captured image of the monitoring area imaged by the imaging device, an object tracker that detects an appearing object appearing in the monitoring area from the captured image and tracks between the captured images for each appearing object, an unattended object detector that detects an appearing object not displaced beyond a predetermined time as an unattended object based on a tracking result for each appearing object by the object tracker, a progress information generator that generates progress information of the unattended object after the appearance in the monitoring area based on the tracking result for each appearing object by the object tracker, and a notification image generator that generates notification image by superimposing the progress information on the captured image.

According to the present disclosure, it is possible to provide a user with progress information of the unattended object after the appearance in the monitoring area. In addition, in this way, it is possible for the user to grasp the change in the state of the unattended object or the details from the appearance until the alarm is issued.

BRIEF DESCRIPTION OF DRAWINGS

FIG. 11 is a flowchart showing the flow of processing in an unattended object monitoring device according to the second embodiment.

DESCRIPTION OF EMBODIMENTS

Figure 1:
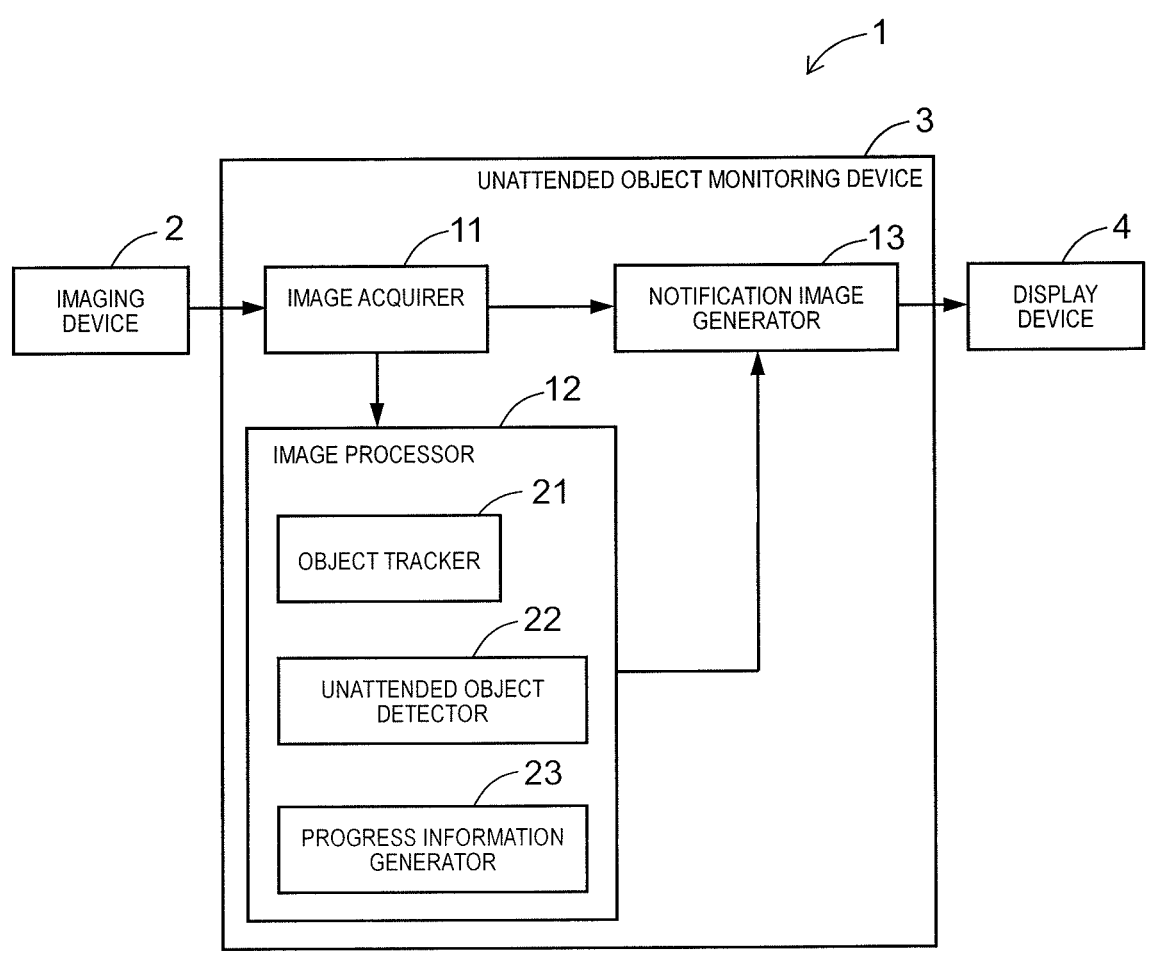
FIG. 1 is a schematic configuration diagram of an unattended object monitoring system according to a first embodiment.

Prior to describing the embodiments, the problems in the related art will be briefly described. By the way, in the technique in the related art of PTL 1, there was a problem that it is not possible to provide a user with progress information of an unattended object after the appearance in a monitoring area. If it is possible to provide the user with the progress information of the unattended object after the appearance in the monitoring area, this is useful because it enables the user to grasp how the state of the unattended object changes and the occurrence of the unattended object until the alarm is issued.

In addition, in the techniques in the related art of the above-mentioned PTL 2 and PTL 3, it is possible to specify the owner of an unattended object, but there was a problem that the user could not see the unattended object in a case where the unattended object is hidden behind another appearing object such as the owner or another unattended object.

Even if the unattended object is hidden behind another appearing object, if it is possible to display the unattended object in the image, it is beneficial because the user is able to check the state of the unattended object.

The present disclosure has been devised in view of such problems of the technique in the related art, and a first object of the present disclosure is to provide an unattended object monitoring device capable of providing a user with progress information of an unattended object after the appearance in a monitoring area, an unattended object monitoring system equipped with the same, and an unattended object monitoring method. In addition, a second object of the present disclosure is to provide an unattended object monitoring device capable of displaying an unattended object in an image, an unattended object system equipped with the same, and an unattended object monitoring method even if the unattended object is hidden behind another appearing object.

A first disclosure made to solve the above problem is an unattended object monitoring device that detects an unattended object left behind in a monitoring area based on a captured image of the monitoring area imaged by an imaging device, including a processor, and a memory that stores an instruction, the device further comprising, as a configuration when the processor executes the instruction stored in the memory, an image acquirer that acquires a captured image of the monitoring area imaged by the imaging device, an object tracker that detects an appearing object appearing in the monitoring area from the captured image and tracks between the captured images for each appearing object, an unattended object detector that detects an appearing object not displaced beyond a predetermined time as the unattended object based on a tracking result for each appearing object by the object tracker, a progress information generator that generates progress information of the unattended object after the appearance in monitoring area based on the tracking result for each appearing object by the object tracker, and a notification image generator that generates notification image by superimposing the progress information on the captured image.

According to the unattended monitoring device of the first disclosure, it is possible to provide the user with the progress information of the unattended object after the appearance in the monitoring area.

In addition, in a second disclosure, the progress information includes an elapsed time from a predetermined time after the appearance in the monitoring area in the first disclosure.

According to the unattended object monitoring device of the second disclosure, it is possible to visually display the elapsed time from a predetermined time after the appearance in the monitoring area to the user in a visually easy-to-understand manner.

In addition, in a third disclosure, the progress information includes a time-series image of an unattended object from a predetermined time after the appearance in the monitoring area in the first or second disclosure.

According to the unattended object monitoring device of the third disclosure, it is possible to display the change of the state of the unattended object from the predetermined time after the appearance in the monitoring area to the user in a visually easy-to-understand manner.

In addition, in a fourth disclosure, in a case where an appearing object is detected, a frame image surrounding the appearing object is further superimposed on the notification image in any one of the first to third disclosures.

According to the unattended object monitoring device of the fourth disclosure, in a case where an appearing object is detected, the appearing object may be displayed to the user in a visually easy-to-understand manner.

In addition, in a fifth disclosure, the notification image generator changes the color of the frame image according to the elapsed time from a predetermined time after the appearance of the unattended object in the monitoring area in the fourth disclosure.

According to the unattended object monitoring device of the fifth disclosure, it is possible to visually display the elapsed time from a predetermined time after the appearance of the unattended object in the monitoring area to the user in a visually easy-to-understand manner.

In addition, a sixth disclosure includes an image layer generator that generates an image layer including an image of the appearing object for each appearing object and a background image generator that generates a background image by removing appearing objects from a captured image, in which a notification image generator superimposes each image layer on the background image in order of detection of appearing objects included in each image layer, in a case where a plurality of appearing objects are detected in any of the first to fifth disclosures.

According to the unattended object monitoring device according to the sixth disclosure, even when the unattended object is hidden behind another appearing object, it is possible to display the unattended object in the image.

In addition, a seventh disclosure is an unattended object monitoring system including the unattended object monitoring device according to any one of the first to sixth disclosures, an imaging device for imaging the monitoring area, and a display device that displays a notification image generated by the unattended object monitoring device.

In addition, an eighth disclosure is an unattended object monitoring method for detecting an unattended object left behind in a monitoring area based on a captured image of the monitoring area imaged by an imaging device, includes acquiring a captured image of the monitoring area imaged by the imaging device, detecting an appearing object appearing in the monitoring area from the captured image and tracking between the captured images for each appearing object, detecting the appearing object not displaced beyond a predetermined time as the unattended object based on a tracking result for each appearing object, generating progress information of the unattended object after the appearance in the monitoring area based on the tracking result for each appearing object, and generating a notification image by superimposing the progress information on the captured image.

Hereinafter, embodiments will be described with reference to drawings.

First Embodiment

First, an unattended object monitoring system 1 according to a first embodiment will be described with reference to FIGS. 1 to 6. This unattended object monitoring system 1 is a system for detecting an unattended object left behind in the monitoring area based on the captured image of the monitoring area imaged by imaging device 2 and raising an alarm in a case where an unattended object is detected, and may be applied to monitoring of unattended suspicious objects in a space such as stations and airports used by a large number of unspecified persons. Hereinafter, a case where unattended object monitoring system 1 according to the present disclosure is applied to monitoring an unattended suspicious object in a station building will be described. Examples of an unattended object include articles (for example, paper bags and bags), people, or the like. An unattended object is not particularly limited and may be various other objects such as a wheelchair, an electric cart, and the like, for example.

FIG. 1 is a schematic configuration diagram of unattended object monitoring system 1 according to the first embodiment. As shown in FIG. 1, unattended object monitoring system 1 is configured to include imaging device 2, unattended object monitoring device 3, and display device 4. Display device 4 serves as a notification device for notifying an observer of an alarm. Unattended object monitoring device 3 is connected to imaging device 2 and display device 4 via wired or wireless communication such as local area network (LAN). The connection form between unattended object monitoring device 3 and imaging device 2 and display device 4 is not particularly limited and may be, for example, connection via a network such as the Internet, or the devices may be connected to each other by a communication cable using a general-purpose interface (for example, a universal serial bus (USB) interface).

Imaging device 2 is a general imaging device such as a CCD camera and the like, is installed on a wall, a ceiling, or the like, and images a predetermined monitoring area in time series as a still image or a moving image. Imaging device 2 is not particularly limited in terms of the form, function, arrangement, quantity and the like thereof as far as a monitoring area may be imaged in time series, and various modifications thereof are possible. For example, imaging device 2 may be a panoramic camera installed on a wall or the like and capable of imaging 180 degrees with one unit, or an omnidirectional camera installed on a ceiling or the like and capable of imaging 360 degrees with one unit. A captured image of the monitoring area captured in time series by imaging device 2 is input to unattended object monitoring device 3.

Display device 4 is a general display device such as a monitor (display) installed in a monitoring room or the like where the observer performs monitoring work and displays a notification image (see FIG. 4) output from unattended object monitoring device 3. Details of the notification image will be described later. Display device 4 is not particularly limited in terms of the form, function, arrangement, quantity, and the like thereof as far as the notification image may be displayed, and various modifications are possible. For example, display device 4 may be a display screen of a mobile terminal carried by the observer when leaving the monitoring room for patrol or the like.

Unattended object monitoring device 3 is a general computer device and includes a central processing unit (CPU) that comprehensively executes various kinds of information processing, control of peripheral devices, or the like based on a predetermined control program, a random-access memory (RAM) that functions as a work area of the CPU, a read-only memory (ROM) that stores control programs executed by the CPU or data, a network interface that executes communication processing via a network, and the like, which is not shown in detail. Various functions (generation of progress information, for example) of unattended object monitoring device 3 to be described in detail later may be realized by the CPU executing a predetermined control program (for example, a progress information generation program). Unattended object monitoring device 3 is not limited to a computer device, and it is also possible to use another information processing device (such as a server and the like) capable of performing the same functions. In addition, at least a part of the functions of unattended object monitoring device 3 may be replaced by another known hardware processing.

Unattended object monitoring device 3 issues an alarm via display device 4 when a predetermined time has elapsed since the unattended object was detected. Specifically, an alarm is issued by displaying information indicating raising an alarm on the notification image output to display device 4. For example, when an unattended object is detected, the unattended object is surrounded by a frame image, and when a predetermined time has elapsed since the unattended object was detected, the color of the frame image may be changed to a prominent color, or an alarm may be issued by blinking the frame image. In addition, unattended object monitoring device 3 may control an alarm raising device not shown to issue an alarm. As the alarm raising device, in addition to a general alarm raising device such as an alarm buzzer, an alarm lamp, or the like, a sound generation device that sounds a predetermined alarm message by voice may be used.

As shown in FIG. 1, unattended object monitoring device 3 includes image acquirer 11, image processor 12, and notification image generator 13, and image processor 12 includes object tracker 21, unattended object detector 22, and progress information generator 23. Each unit is controlled by a controller (not shown).

Image acquirer 11 is connected to imaging device 2 and acquires a captured image of the monitoring area from imaging device 2. Image acquirer 11 is connected to image processor 12 and notification image generator 13, and the captured image acquired by image acquirer 11 from imaging device 2 is input to image processor 12 and notification image generator 13.

Image processor 12 acquires a captured image from image acquirer 11. In a case where the captured image is a still image captured at a predetermined time interval, the captured image is acquired as the still image data, and in a case where the captured image is a moving image, the captured image is acquired as still image data (image frame data) extracted at a predetermined time interval from the moving image. The captured image (still image data) acquired by image processor 12 from image acquirer 11 is processed by object tracker 21, unattended object detector 22, and progress information generator 23.

Object tracker 21 detects an appearing object appearing in the monitoring area from the captured image and tracks between the captured images after the detection of the appearing object for each detected appearing object. The appearing object may be a person, a moving object such as a wheelchair, an electric cart, or the like on which a person rides, or another manned or unmanned moving object or the like. Detection of the appearing object is performed by comparing the captured background image with the captured image in advance or by comparing two captured images adjacent to each other in time series. Specifically, a degree of dissimilarity (difference or correlation value) of pixel values (for example, brightness value) of corresponding pixels between the captured images to be compared is obtained, pixels whose obtained dissimilarity exceeds a predetermined threshold are extracted, and an area in which the pixels extracted in close proximity are put together is detected as an appearing object. When an appearing object is detected from the captured image, an individual identification code is assigned to each detected appearing object, and tracking is performed between the captured images after the detection of the appearing object. When a new appearing object appears in the vicinity of the already detected appearing object, it is determined that the new appearing object has been separated from the already detected appearing object. In this case, the identification code of the already detected appearing object is not changed, and an appearing object which has newly appeared is assigned with a new identification code and managed. When an appearing object is detected by object tracker 21, the detection result is input to notification image generator 13.

Figure 2A:
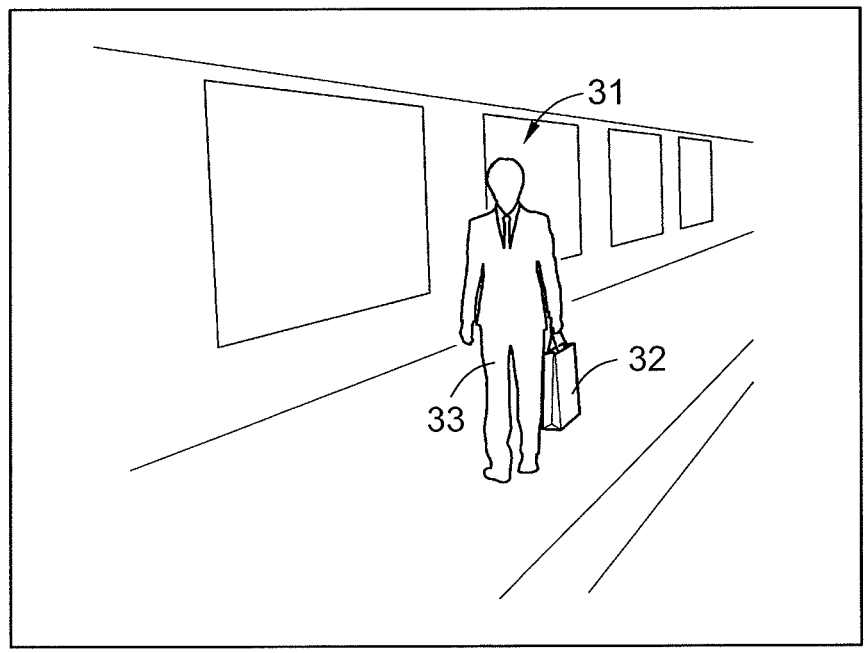
FIG. 2A is a diagram showing an example in which an appearing object (a person having a bag) appearing is detected in a monitoring area from a captured image.
Figure 2B:
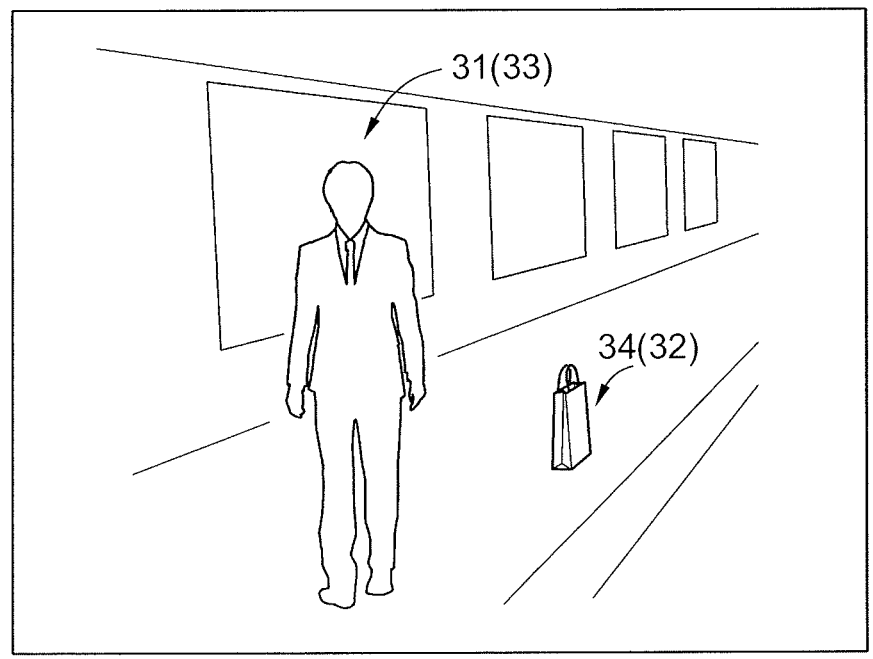
FIG. 2B is a diagram showing an example in which an appearing object (bag) newly appearing is detected in the monitoring area from the captured image.

FIG. 2A is a diagram showing an example in which appearing object 31 appearing in the monitoring area is detected from the captured image by object tracker 21. In the example of FIG. 2A, appearing object 31 is person 33 with bag 32. At this time, bag 32 and person 33 are not individually identified but are detected as one appearing object 31. FIG. 2B is a diagram showing an example in which appearing object 34 newly appearing in the monitoring area is detected from the captured image by object tracker 21. In the example of FIG. 2B, bag 32 separated from person 33 is detected as the new appearing object 34. Thereafter, bag 32 is tracked as the new appearing object 34. In addition, appearing object 31 (that is, person 33) separated by bag 32 is tracked as it is as appearing object 31.

Unattended object detector 22 detects an unattended object based on the tracking result for each appearing object by object tracker 21. Specifically, for each appearing object detected by object tracker 21, a temporal displacement in the captured image of the appearing object is obtained, and an appearing object which is not displaced beyond a predetermined time, that is, is stationary beyond a predetermined time is detected as an unattended object. When an unattended object is detected, a unique identification code is assigned to each unattended object, and tracking is performed between the captured images after the detection of the unattended object. In a case where an unattended object is detected by unattended object detector 22, the detection result is input to notification image generator 13.

Progress information generator 23 generates progress information of the unattended object after time when the unattended object appears in the monitoring area (hereinafter, referred to as "time of object appearance") based on the tracking result for each appearing object by object tracker 21. As the progress information, the elapsed time from a predetermined time after the time of object appearance, the elapsed time from a predetermined time since the unattended object was detected, and a time-series image of the unattended object after a predetermined time after the time of object appearance may be mentioned. The progress information is not limited thereto and may be, for example, various other information or images such as an image and time at the time of the appearance of the unattended object in the monitoring area, an image and time at the time of detection of the unattended object, the like. The progress information generated by progress information generator 23 is input to notification image generator 13.

Notification image generator 13 acquires a captured image from image acquirer 11. Then, in a case where the progress information of the unattended object is input from progress information generator 23, notification image generator 13 generates a notification image by superimposing the progress information of the unattended object on the captured image. Specifically, notification image generator 13 generates an image including the progress information of the unattended object based on the progress information input from progress information generator 23 and superimposes the image on the captured image to generate a notification image. In a case where the progress information input from progress information generator 23 is an image including progress information, a notification image is generated by superimposing the image on the captured image.

In addition, in a case where an appearing object is detected by object tracker 21, notification image generator 13 further superimposes a frame image surrounding the appearing object on the notification image. If an unattended object is not detected by unattended object detector 22, notification image generator 13 superimposes a frame image surrounding the appearing object on the captured image and generates a notification image. The notification image generated by notification image generator 13 is output to display device 4. In a case where an appearing object is not detected by object tracker 21, notification image generator 13 outputs the captured image acquired from image acquirer 11 to display device 4 as it is.

Figure 3A:
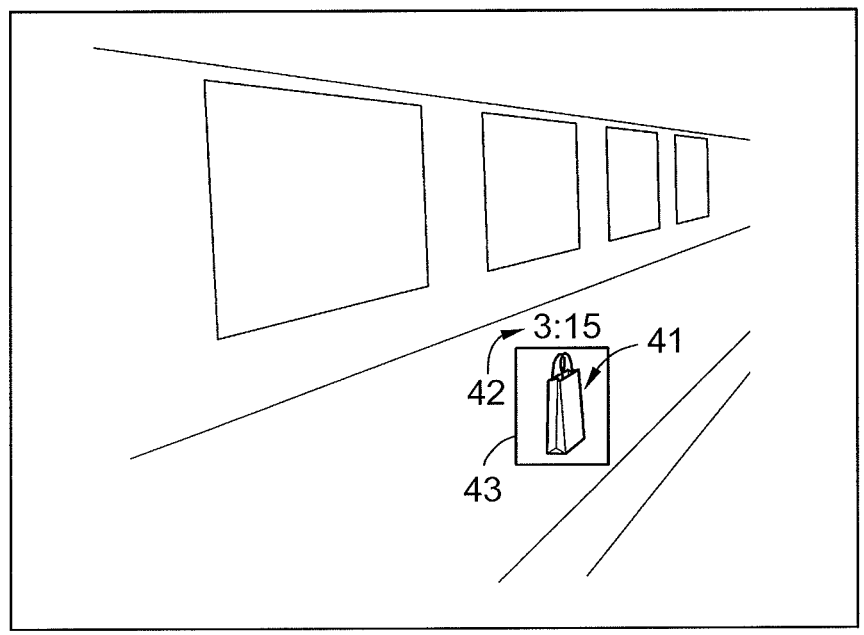
FIG. 3A is a diagram showing an example of a notification image in a case where progress information is an elapsed time from the time when the unattended object appears in the monitoring area.
Figure 3B:
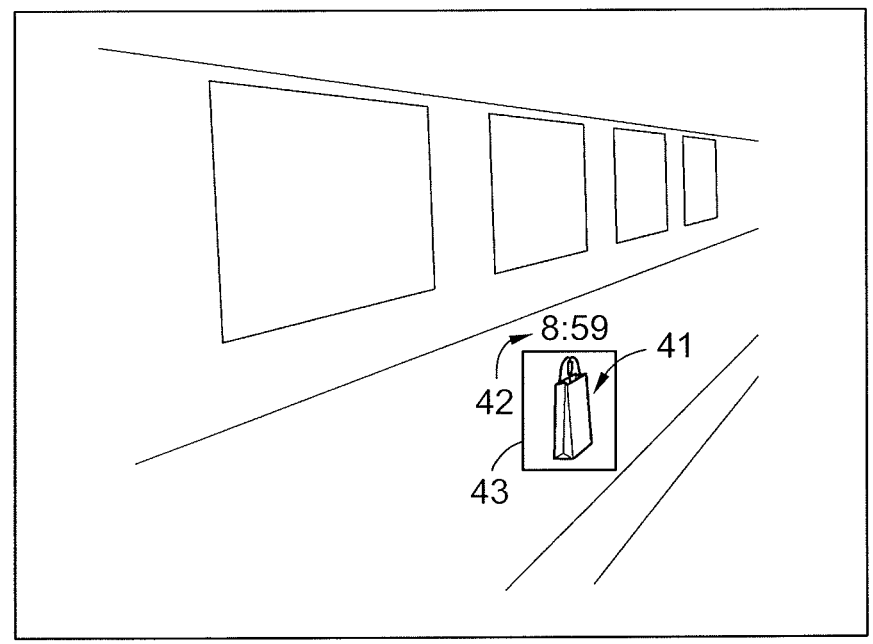
FIG. 3B is a diagram showing another example of the notification image in a case where the progress information is an elapsed time from the time when the unattended object appears in the monitoring area.

FIGS. 3A and 3B are diagrams showing an example of the notification image when the progress information is the elapsed time from the time of object appearance. In this case, notification image generator 13 generates an image (hereinafter, referred to as "elapsed time image") indicating the elapsed time from the time of object appearance and superimposes the elapsed time image on the captured image to generate a notification image. In addition, notification image generator 13 further superimposes the frame image surrounding the unattended object on the notification image.

In the example of FIGS. 3A and 3B, a paper bag 41 is detected as an unattended object, and an elapsed time image 42 is superimposed on a position on the upper side of paper bag 41 in the captured image. In addition, frame image 43 surrounding paper bag 41 is further superimposed on the notification image. In the example of FIG. 3A, elapsed time image 42 of "3:15" indicating that the elapsed time from the time when paper bag 41 which is an unattended object appeared in the monitoring area is 3 minutes 15 seconds is superimposed on the captured image. In addition, in the example of FIG. 3B, elapsed time image 42 of "8:59" indicating that the elapsed time from the time when paper bag 41 which is an unattended object appeared in the monitoring area is 8 minutes 59 seconds is superimposed on the captured image.

As described above, when elapsed time image 42 is superimposed on the captured image, it is possible to display the elapsed time from the appearance of paper bag 41 which is an unattended object in the monitoring area to the user in a visually easy-to-understand manner. In addition, it is possible to display the unattended object (paper bag 41) to the user in a visually easy-to-understand manner by surrounding the unattended object (paper bag 41) with frame image 43. In a case where another appearing object or an unattended object other than paper bag 41 is detected from the captured image, when these objects are surrounded by a frame image, it is possible to display these objects to the user in a visually easy-to-understand manner. In the example of FIGS. 3A and 3B, the case where the progress information is an elapsed time from the time of object appearance has been described, but the progress information may be the elapsed time from a predetermined time after the time of object appearance. In addition, the progress information may be the elapsed time from the point in time when the unattended object is detected (or a predetermined time thereafter).

Figure 4A:
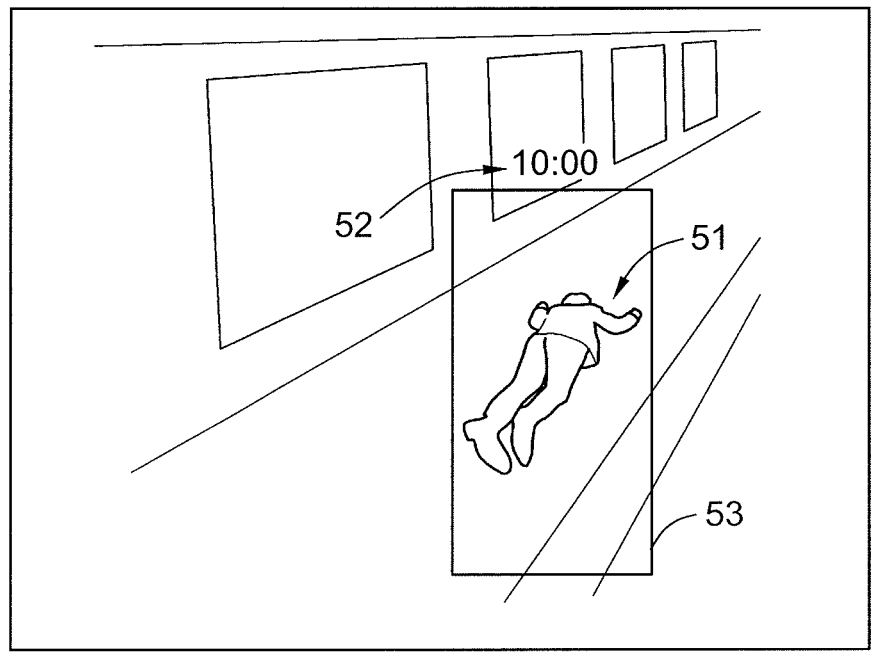
FIG. 4A is a diagram showing an example of the notification image in a case where the progress information is time-series images of the unattended object from the time when the unattended object appears in the monitoring area.
Figure 4B:
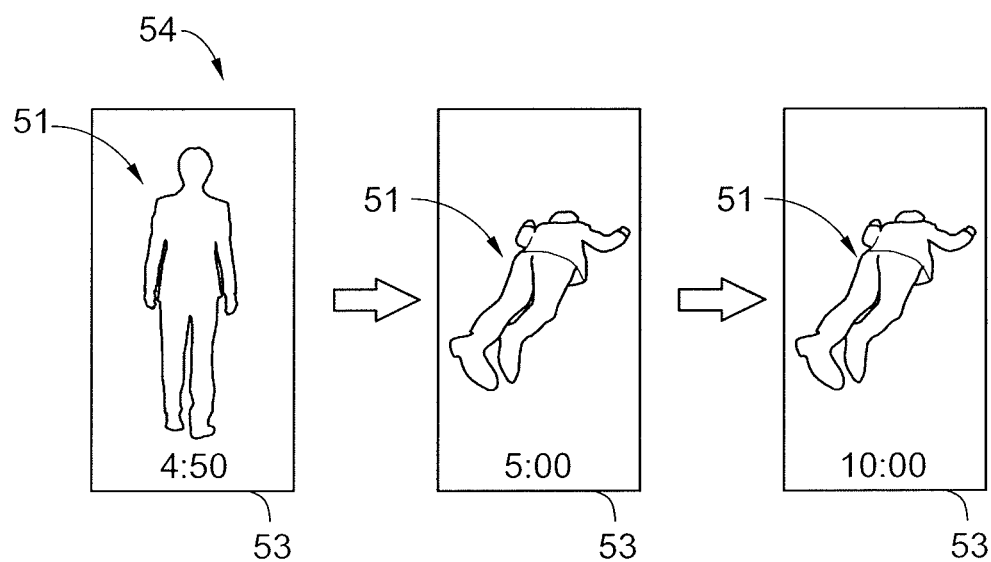
FIG. 4B is a diagram showing an example of time-series images in a case where the progress information is time-series images of the unattended object from the time when the unattended object appears in the monitoring area.

FIGS. 4A and 4B are diagrams showing an example of the notification image when the progress information is a time-series image of an unattended object after the time of object appearance. In this case, notification image generator 13 superimposes the time-series image of the unattended object input from progress information generator 23 on the captured image and generates a notification image. In addition, notification image generator 13 further superimposes the frame image surrounding the unattended object on the notification image.

In the example of FIG. 4A, person 51 who collapsed on a floor is detected as an unattended object, and an elapsed time image 52 is superimposed on a position on the upper side of person 51 in the captured image. In addition, a frame image 53 surrounding person 51 is further superimposed. In the example of FIG. 4A, the elapsed time image 52 "10: 00" indicating that the elapsed time from the time of object appearance of person 51 which is an unattended object is 10 minutes is superimposed on the captured image.

This example shows how an alarm is issued when 10 minutes have elapsed from the time of object appearance and when an unattended object occurs. That is, the time in FIG. 4A is the time when an alarm is issued. When an alarm is issued, as shown in FIG. 4B, time-series image 54 of person 51 which is an unattended object, may be displayed in frame image 53 by the observer operating unattended object monitoring device 3 via an input operation device (not shown) such as a keyboard and a mouse. Time-series image 54 is displayed as a still image (frame-by-frame image) or a moving image at predetermined time intervals. In addition, the elapsed time of time-series image 54 is also displayed in time-series image 54. In the example of FIG. 4B, person 51 is standing in the image at the time of 4 minutes and 50 seconds, and in the images after the time of 5 minutes 00 seconds, person 51 collapsed.

As described above, when time-series image 54 of person 51 which is an unattended object is superimposed on the captured image, it is possible to display the change of the state of the unattended object (person 51) after the time of object appearance to the user in a visually easy-to-understand manner. In the example of FIG. 4B, it is found that person 51 stood up to the time of 4 minutes and 50 seconds, but collapsed at the time of 5 minutes 00 seconds. As a result, the observer may grasp the state before person 51 collapsed and the time when person 51 collapsed. In the examples of FIGS. 4A and 4B, the case where the progress information is the time-series image of the unattended object after the time of object appearance has been described, but the progress information may be an elapsed time from a predetermined time after the time of object appearance. In addition, the progress information may be the elapsed time from the time when the unattended object is detected (or a predetermined time thereafter).

The display position of time-series image 54 of person 51 is not limited within frame image 53 and may be another position in the notification image or on another screen, for example. In addition, the display position or display method of the elapsed time of time-series image 54 may be various. In addition, the time at which the observer displays time-series image 54 may be the time before an alarm is issued. For example, time-series image 54 may be displayed at the time of FIG. 4B where person 51 collapsed. In this way, since it is possible to grasp the state change of person 51 earlier than the time when an alarm is issued, it is possible to respond more quickly.

Figure 5A:
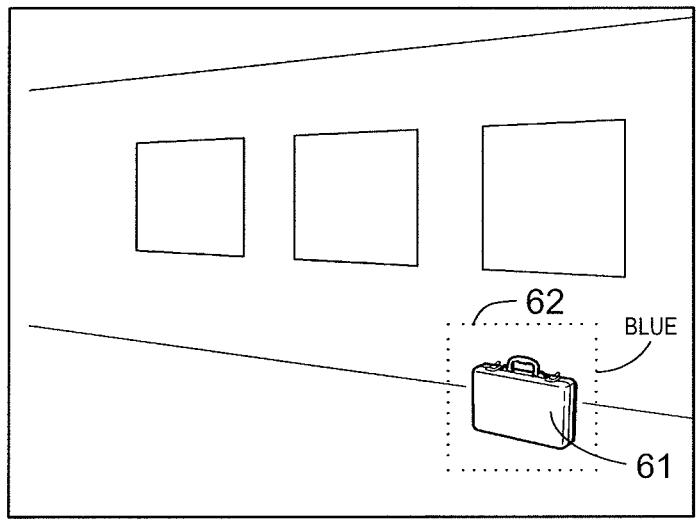
FIG. 5A is a diagram in which the progress information is the elapsed time from the time the unattended object appears in the monitoring area, a diagram showing an example of the notification image showing the elapsed time by a color change of a frame image, and a diagram showing an example of the notification image in which the color of the frame image is blue.
Figure 5B:
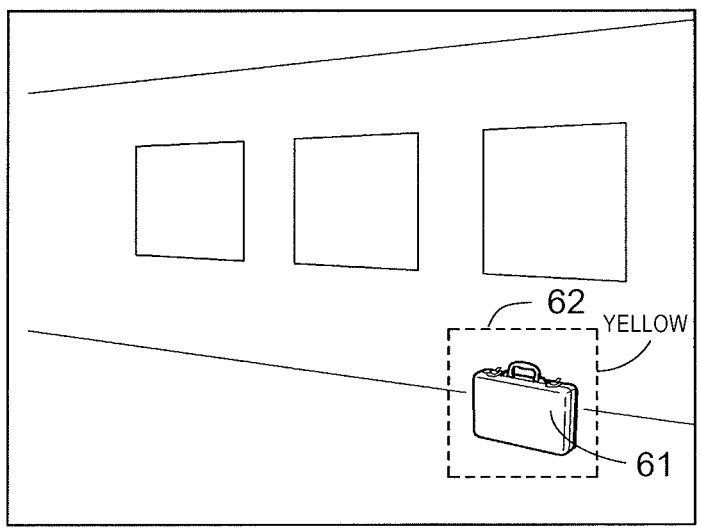
FIG. 5B is a diagram in which the progress information the elapsed time from the time the unattended object appears in the monitoring area, a diagram showing an example of the notification image showing the elapsed time by a color change of a frame image, and a diagram showing an example of the notification image in which the color of the frame image is yellow.
Figure 5C:
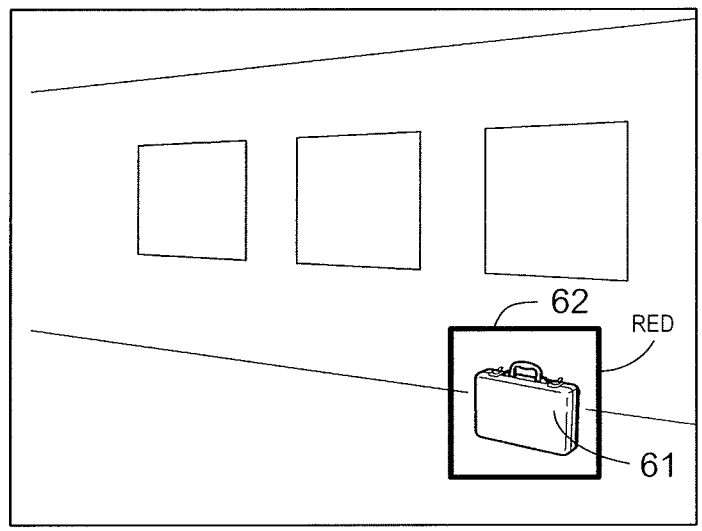
FIG. 5C is a diagram in which the progress information is the elapsed time from the time the unattended object appears in the monitoring area, a diagram showing an example of the notification image showing the elapsed time by a color change of a frame image, and a diagram showing an example of the notification image in which the color of the frame image is red.

FIGS. 5A to 5C are diagrams showing an example of the notification image in which the progress information is the elapsed time from the time of object appearance and the elapsed time is indicated by a change in the color of the frame image. In this case, notification image generator 13 superimposes a frame image surrounding the unattended object on the captured image and changes the color of the frame image in accordance with the elapsed time. In the example of FIGS. 5A to 5C, the color of the frame image is changed in order of blue, yellow, and red in accordance with the elapsed time.

In the example of FIGS. 5A to 5C, a bag 61 is detected as an unattended object, and frame image 62 surrounding bag 61 is superimposed on the captured image. In FIGS. 5A to 5C, the color of frame image 62 is changed in order of blue (see FIG. 5A), yellow (see FIG. 5B), and red (see FIG. 5C)

as time elapses. FIG. 5A is a notification image of a period from the time of object appearance of bag 61 which is an unattended object to the time when a predetermined time has elapsed, FIG. 5B is a notification image of a period from the time of FIG. 5A to the time when a predetermined time has elapsed, and FIG. 5C is a notification image of a period from the time of FIG. 5B to the time when a predetermined time has elapsed. In this example, an alarm is set to be issued at the time of FIG. 5C, and the alarm is issued by changing frame image 62 to red. The time interval for changing the color of frame image 62 may be arbitrarily set. In addition, the color of frame image 62 to be changed in accordance with the elapsed time may also be arbitrarily set. Further, the shape, brightness, and the like of frame image 62 may be changed or blinked in accordance with not only the color of frame image 62 but also the elapsed time.

As described above, when the color of the frame image is changed in accordance with the elapsed time, it is possible to display the elapsed time from time of object appearance of bag 61 which is an unattended object to the user in a visually easy-to-understand manner. In the example of FIG. 5, the case where the progress information is the elapsed time from the time of object appearance has been described, but the progress information may be an elapsed time from a predetermined time after the time of object appearance. In addition, the progress information may be the elapsed time from the time when the unattended object is detected (or a predetermined time thereafter).

Figure 6:
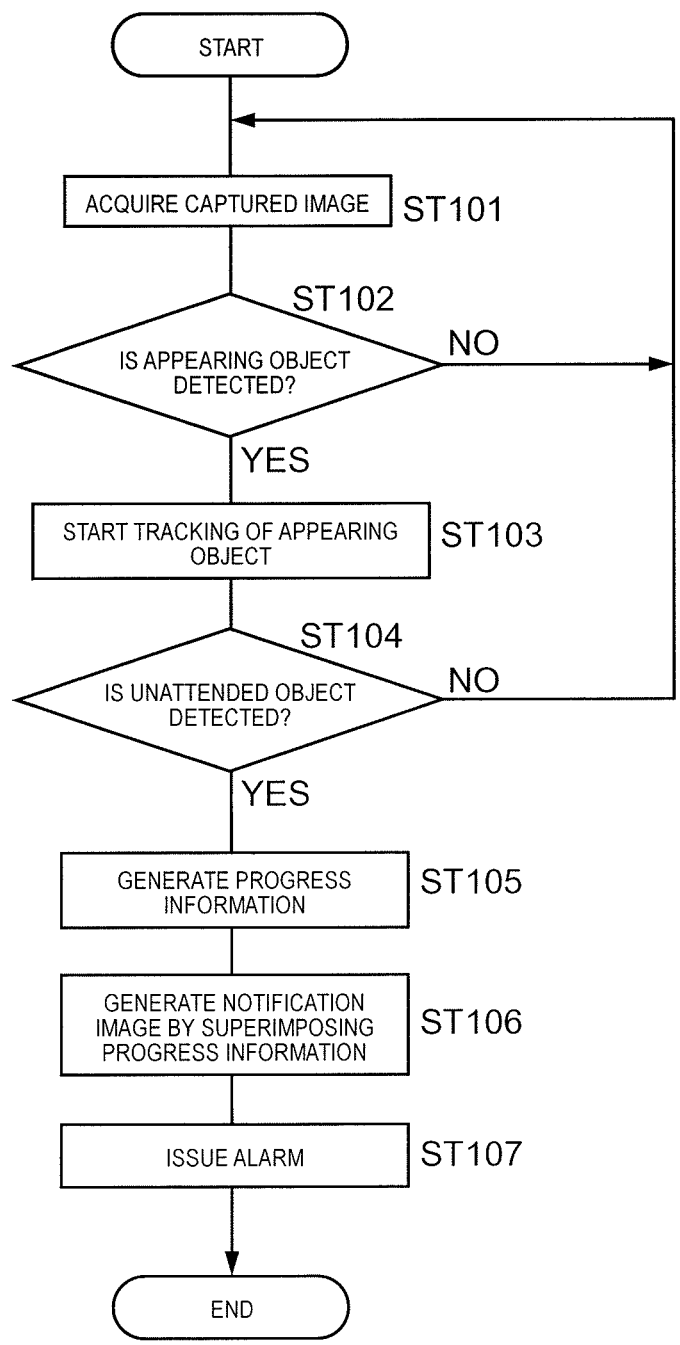
FIG. 6 is a flowchart showing the flow of processing in an unattended object monitoring device according to the first embodiment.
Figure 7:
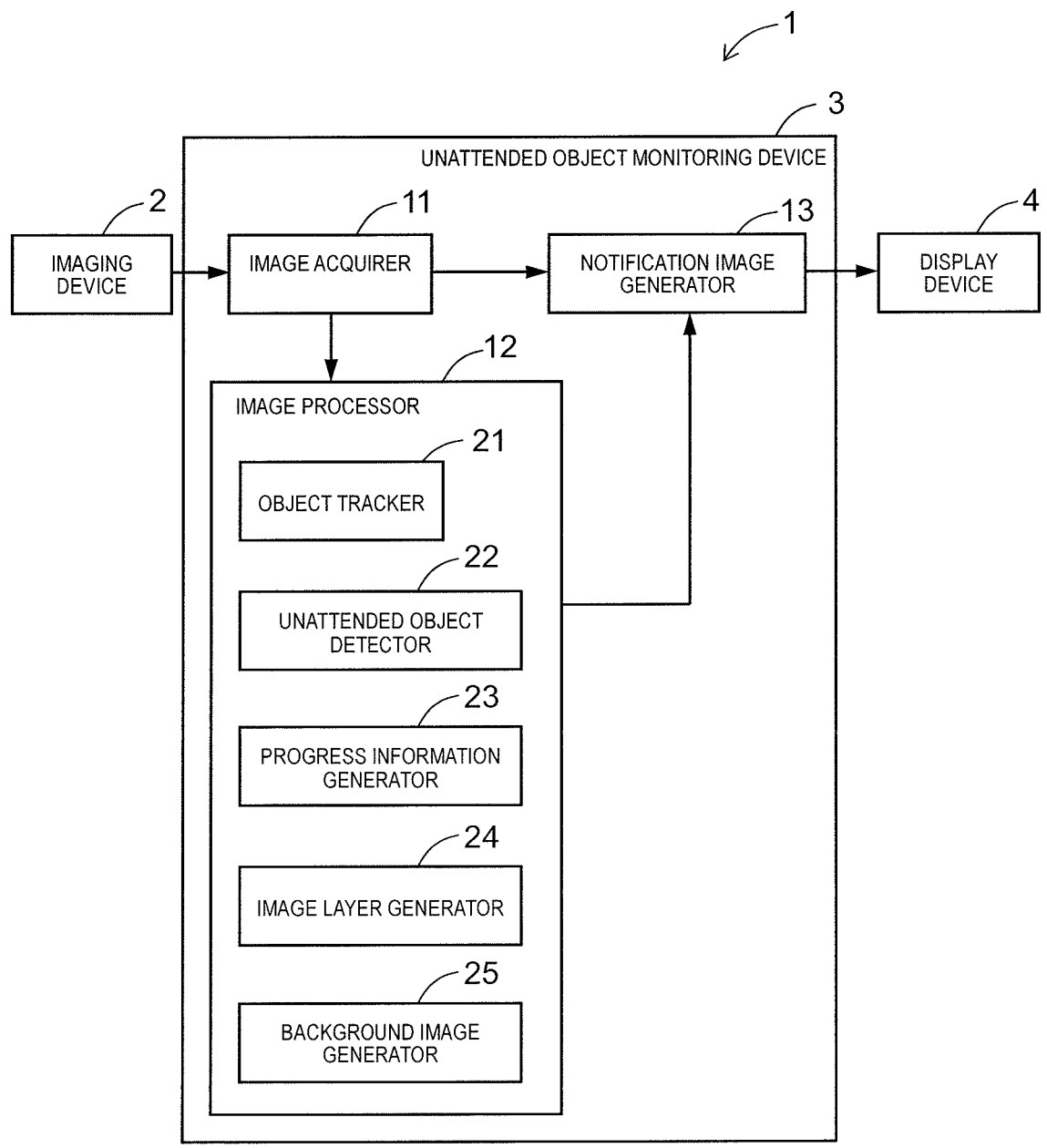
FIG. 7 is a schematic configuration diagram of an unattended object monitoring system according to a second embodiment.

Next, the flow of processing in unattended object monitoring device 3 of unattended object monitoring system 1 according to the first embodiment shown in FIG. 1 will be described with reference to the flowchart of FIG. 6.

First, image acquirer 11 acquires a captured image from imaging device 2 and inputs the captured image to image processor 12 and notification image generator 13 (step ST101). Subsequently, object tracker 21 detects an appearing object (see FIGS. 2A and 2B) appearing in the monitoring area from the captured image (step ST102). In a case where an appearing object is detected (step ST102: Yes), the processing proceeds to step ST103, and in a case where no appearing object is detected (step ST102: No), the processing returns to step ST101.

In step ST103, object tracker 21 tracks between the captured images after detection of an appearing object for each detected appearing object. In the following step ST104, unattended object detector 22 detects an appearing object which is not displaced beyond a predetermined time as an unattended object based on the tracking result for each appearing object by object tracker 21. In a case where an unattended object is detected (step ST104: Yes), the processing proceeds to step ST105, and in a case where no unattended object is detected (step ST104: No), the processing returns to step ST101.

In step ST105, progress information generator 23 generates progress information of the unattended object after the time of object appearance based on the tracking result for each appearing object by object tracker 21. As described above, as the progress information, the elapsed time from a predetermined time after the time of object appearance, the elapsed time from a predetermined time since the unattended object was detected, and a time-series image of the unattended object after a predetermined time after the time of object appearance may be mentioned.

Next, in step ST106, notification image generator 13 superimposes the progress information generated by progress information generator 23 on the captured image and generates a notification image (see FIGS. 3 to 5). In addition, notification image generator 13 further superimposes the frame image surrounding the appearing object on the notification image. The generated notification image is output to display device 4.

Then, in step ST107, when a predetermined time has elapsed since the unattended object was detected, unattended object monitoring device 3 issues an alarm via display device 4 or the alarm raising device not shown.

As described above, according to the first embodiment, since a notification image may be generated by superimposing the progress information of the unattended object after the time of object appearance on the captured image, it is possible to provide the user with the progress information of the unattended object after the appearance in the monitoring area. In addition, it is possible to display the progress information of the unattended object to the user in an intuitively easy-to-understand manner.

Second Embodiment

Next, unattended object monitoring system 1 according to the second embodiment will be described with reference to FIGS. 7 to 11. Unattended object monitoring device 3 according to the second embodiment is different from unattended object monitoring device 3 according to the first embodiment shown in FIG. 1 in that unattended object monitoring device 3 further includes image layer generator 24 and background image generator 25. Since the other points are the same as those of the first embodiment described above, the same reference numerals are given and the description thereof will be omitted.

In a case where a plurality of appearing objects are detected in the monitoring area, image layer generator 24 generates an image layer including the image of the appearing object for each detected appearing object. Specifically, a plurality of appearing objects are identified based on the feature amount level of the local area in the captured image, and an image layer is generated for each identified appearing object. In addition, in a case where the appearing object is an unattended object and a background object is present therebehind, an image layer including the image of the background object is also generated. Generation of the image layer of the background object is not essential.

Figure 8:
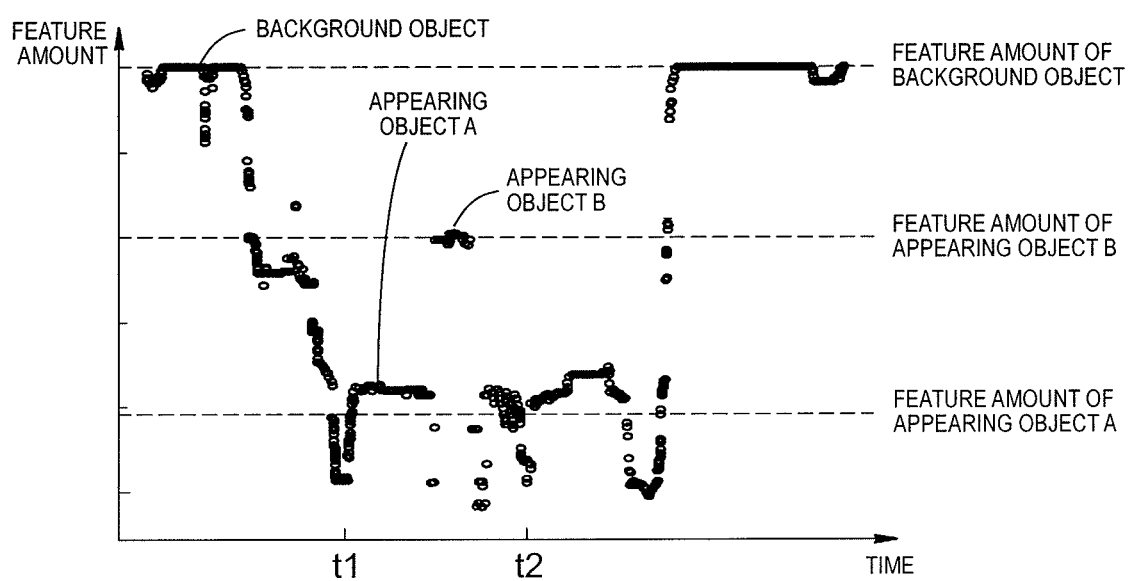
FIG. 8 is a graph showing a feature amount level of a local area in time-series captured images.

FIG. 8 is a graph showing a feature amount level of a local area in a plurality of captured images (captured frames) in time series. In the example of FIG. 8, a background object, appearing object A, and appearing object B are identified according to a feature amount level. Image layer generator 24 generates an image layer for each object identified in this manner. Each image layer is generated by cutting out each object from the background image.

Figure 9A:
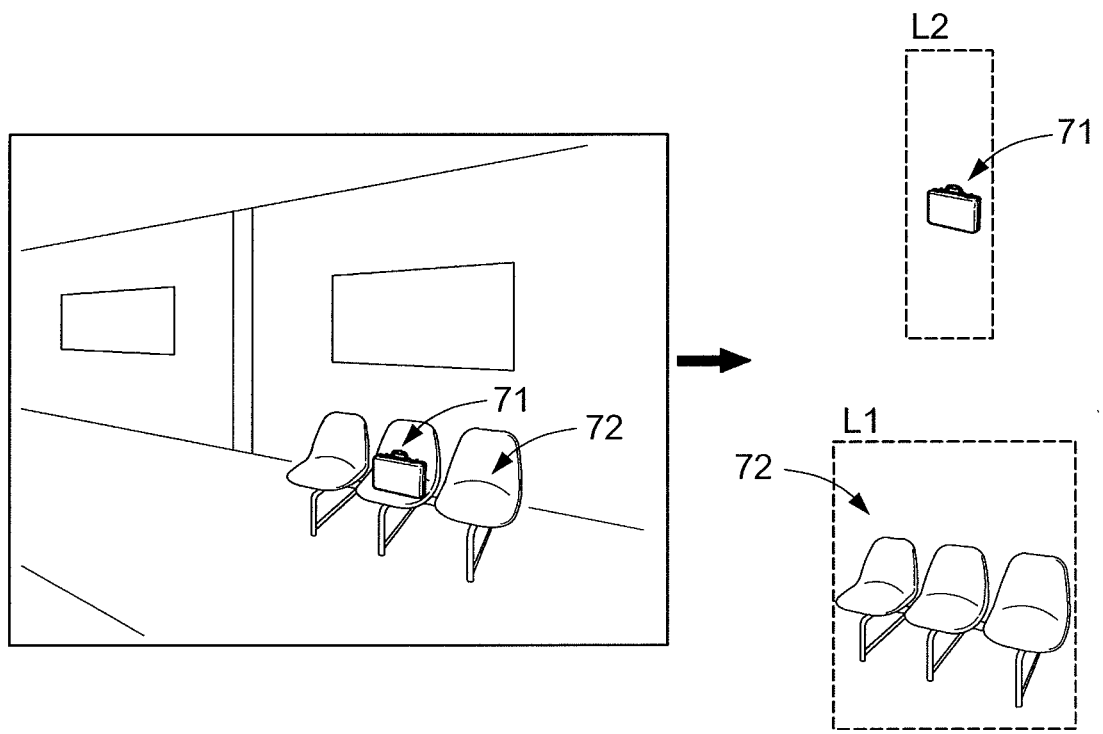
FIG. 9A is a diagram showing an example of image layers of a background object and appearing object A.

FIG. 9A is an image layer generated based on the feature amount level at time t1 in the graph of FIG. 8. In the example of FIG. 9A, appearing object A in FIG. 8 is an unattended object, and bag 71 is detected as an unattended object (appearing object A). In addition, bag 71 is placed on bench 72, and bench 72 is detected as a background object of bag 71 which is an unattended object. As shown on the right side of FIG. 9A, image layer generator 24 generates image layer L1 including an image of bench 72 which is a background object and image layer L2 including an image of bag 71 which is an unattended object (appearing object A).

Figure 9B:
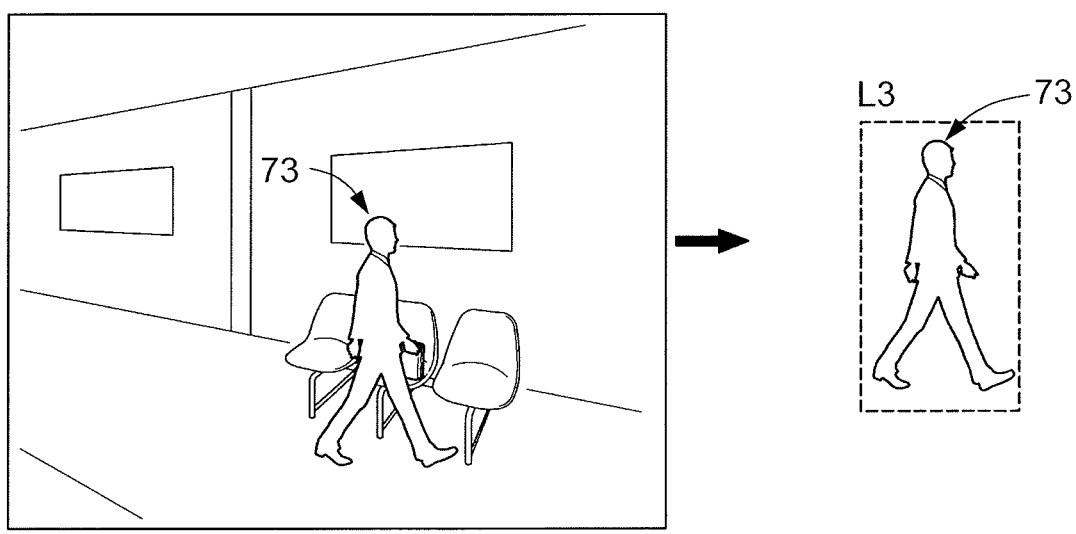
FIG. 9B is a diagram showing an example of an image layer of appearing object B.

FIG. 9B is an image layer generated based on the feature amount level at time t2 in the graph of FIG. 8. In the example of FIG. 9B, a person 73 is detected as appearing object B in FIG. 8. This person 73 is moving from the left to the right in the image and is located in front of bag 71 and bench 72 at this time t2. That is, at this time t2, bag 71 and bench 72 are hidden behind person 73. As shown on the right side of FIG. 9B, image layer generator 24 generates image layer L3 including the image of person 73 which is appearing object B.

Figure 10A:
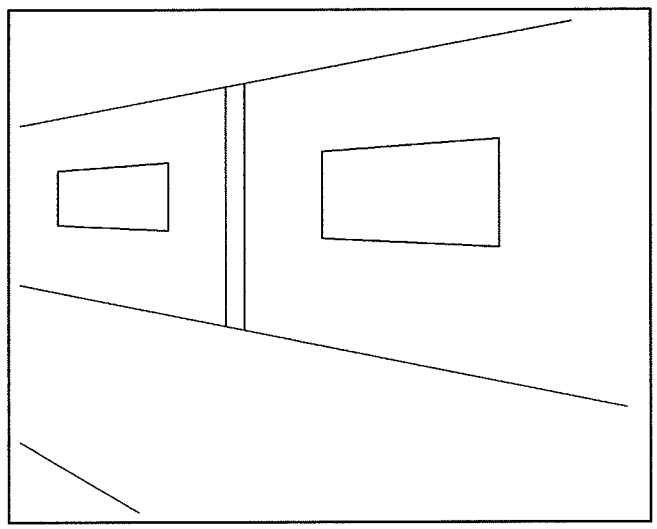
FIG. 10A is a diagram showing an example of a background image.

Background image generator 25 generates a background image by removing the appearing objects from the captured image. FIG. 10A is a diagram showing the background image generated by background image generator 25. Specifically, the image area of the appearing object is extracted as a foreground image based on the difference between the captured image at the time when the first appearing object is detected (in the example of FIG. 9, time t1 at which appearing object A is detected) and the captured image at a previous time. Then, a background image is generated by removing the foreground image from the captured image at the time when the first appearing object is detected. Alternatively, an image of the monitoring area captured in advance in a situation where there is no appearing object may be used as the background image.

Figure 10B:
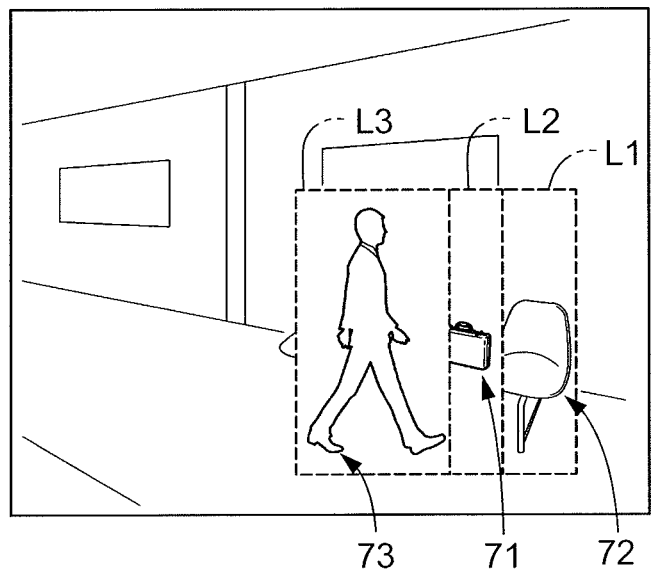
FIG. 10B is a diagram showing an image in which each image layer is superimposed on the background image.

As shown in FIG. 10B, notification image generator 13 superimposes image layers L1 to L3 generated by image layer generator 24 on the background image (see FIG. 10A) in the detection order from the back side. Image layers L1 and L2 are superimposed so that at least a part of the objects included in these image layers are visible. In the example of FIG. 10B, image layers L1 to L3 are superimposed with the positions shifted by a predetermined distance in the left-right direction from each other. As a result, bag 71 and bench 72 hidden behind person 73 may be displayed in the image. The direction and the distance by which the positions of image layers L1 to L3 are shifted may be arbitrarily set. In a case where at least a part of the objects included in image layers L1 and L2 are visible even if the image layers are superimposed as they are, the positions of image layers L1 to L3 do not have to be shifted from each other. In addition, as long as the observer may recognize that image layers L1 to L3 are superimposed with each other, image layers L1 to L3 may be superimposed as they are. In this case, for example, a means for changing the order of superimposition of the image layers such as tabs (not shown) added to the image frames, any other operation keys (not shown), or the like is provided, and by operating the means, the image layer on the back side may be displayed.

Figure 10C:
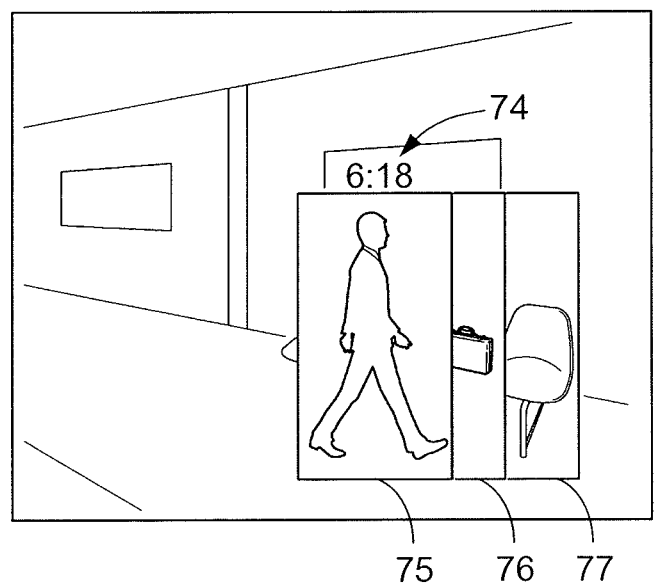
FIG. 10C is a view showing a notification image generated by superimposing the progress information and the frame image on the image of FIG. 10B.

In addition, as shown in FIG. 10C, notification image generator 13 generates a notification image by further superimposing the progress information and the frame image generated by progress information generator 23 on the image (see FIG. 10B) in which each image layer is superimposed on the background image. In the example of FIG. 10C, as the progress information, elapsed time image 74 of "6:18" and the frame images 75 to 77 surrounding person 73, bag 71, and bench 72, respectively, are superimposed. The notification image generated by notification image generator 13 is output to display device 4.

Next, the flow of processing in unattended object monitoring device 3 of unattended object monitoring system 1 according to the second embodiment shown in FIG. 6 will be described with reference to the flowchart of FIG. 11.

The processing in unattended object monitoring device 3 according to the second embodiment is different from the first embodiment in that steps ST201 to ST204 are added between step ST105 and step ST106 of the processing of unattended object monitoring device 3 according to the first embodiment described with reference to FIG. 6. Hereinafter, the added steps ST201 to ST204 will be mainly described.

In a case where an appearing object is detected in the monitoring area in step ST105, in step ST201 following step ST105, it is determined whether or not a plurality of appearing objects have been detected in the monitoring area. In a case where a plurality of appearing objects are detected (step ST201: Yes), the processing proceeds to step ST202, and in a case where a plurality of appearing objects are not detected (step ST201: No), the processing proceeds to step ST106.

In step ST202, image layer generator 24 generates an image layer including the image of the appearing object for each appearing object. In addition, in a case where the appearing object is an unattended object and a background object is present therebehind, an image layer including the image of the background object is also generated (see FIGS. 9A and 9B). Subsequently, in step ST203, image layer generator 24 generates a background image (see FIG. 10A).

In the next step ST204, notification image generator 13 superimposes each image layer generated by image layer generator 24 on the background image generated by background image generator 25 so that at least a part of the objects included in each image layer may be seen (See FIG. 10B). Then, in step ST106 following step ST204, notification image generator 13 further superimposes the progress information and the frame image generated by progress information generator 23 on the image in which each image layer is superimposed on the background image to generate a notification image (see FIG. 10C) and outputs the image to display device 4.

As described above, according to the second embodiment, since each appearing object and background object included in the captured image may be displayed in the image in a case where a plurality of appearing objects are detected in the monitoring area, even if the unattended object is hidden behind another object, it is possible to display the unattended object in the image. In addition, the background object located behind the unattended object may also be displayed in the image.

Although the present disclosure has been described based on specific embodiments, these embodiments are merely examples, and the present disclosure is not limited by these embodiments. All the constituent elements of the unattended object monitoring device according to the present disclosure, the unattended object monitoring system equipped with the same, and the unattended object monitoring method described in the above embodiment are not necessarily all essential and may be appropriately selected without departing from the scope of the present disclosure.

INDUSTRIAL APPLICABILITY

An unattended object monitoring device, an unattended object monitoring system equipped with the same, and an unattended object monitoring method are useful as an unattended object monitoring device capable of providing a user with progress information of an unattended object after the appearance in a monitoring area, an unattended object monitoring system equipped with the same, an unattended object monitoring method, and the like.

REFERENCE MARKS IN THE DRAWINGS

1 UNATTENDED OBJECT MONITORING SYSTEM
2 IMAGING DEVICE
3 UNATTENDED OBJECT MONITORING DEVICE
4 DISPLAY DEVICE (NOTIFICATION DEVICE)
11 IMAGE ACQUIRER

12 IMAGE PROCESSOR
13 NOTIFICATION IMAGE GENERATOR
21 OBJECT TRACKER
22 UNATTENDED OBJECT DETECTOR
23 PROGRESS INFORMATION GENERATOR
24 IMAGE LAYER GENERATOR
25 BACKGROUND IMAGE GENERATOR

The invention claimed is:

1. An unattended object monitoring device that detects an unattended object left behind in a monitoring area based on a captured image of the monitoring area imaged by an imaging device, the device comprising:
   a processor; and
   a memory that stores an instruction,
   the device further comprising, as a configuration when the processor executes the instruction stored in the memory:
   an image acquirer that acquires a captured image of the monitoring area imaged by the imaging device;
   an object tracker that detects an appearing object appearing in the monitoring area from the captured image and tracks between the captured images for each appearing object;
   an unattended object detector that detects the appearing object not displaced beyond a predetermined time as the unattended object based on a tracking result for each appearing object by the object tracker;
   a progress information generator that generates progress information of the unattended object after the appearance in the monitoring area based on the tracking result for each appearing object by the object tracker;
   a notification image generator that generates a notification image by superimposing the progress information on the captured image;
   an image layer generator that generates an image layer including an image of the appearing object for each appearing object in a case where a plurality of the appearing objects are detected; and
   a background image generator that generates a background image by removing the appearing objects from the captured image,
   wherein the notification image generator superimposes each image layer on the background image in an order of detection of the appearing objects included in each image layer.

2. The unattended object monitoring device of claim 1, wherein the progress information includes an elapsed time from a predetermined time after the appearance in the monitoring area.

3. The unattended object monitoring device of claim 1, wherein the progress information includes a time-series image of the unattended object after a predetermined time after the appearance in the monitoring area.

4. The unattended object monitoring device according to claim 1,
   wherein, in a case where the appearing object is detected, the notification image generator further superimposes a frame image surrounding the appearing object on the notification image.

5. The unattended object monitoring device of claim 4, wherein the notification image generator changes the color of the frame image in accordance with an elapsed time from a predetermined time after the appearance of the unattended object in the monitoring area.

6. An unattended object monitoring system comprising:
   the unattended object monitoring device according to claim 1;
   an imaging device for imaging a monitoring area; and
   a display device that displays notification image generated by the unattended object monitoring device.

7. An unattended object monitoring method for detecting an unattended object left behind in a monitoring area based on a captured image of the monitoring area imaged by an imaging device, the method comprising:
   acquiring a captured image of the monitoring area imaged by the imaging device;
   detecting an appearing object appearing in the monitoring area from the captured image and tracking between the captured images for each appearing object;
   detecting the appearing object not displaced beyond a predetermined time as the unattended object based on a tracking result for each appearing object;
   generating progress information of the unattended object after the appearance in the monitoring area based on the tracking result for each appearing object;
   generating a notification image by superimposing the progress information on the captured image;
   generating an image layer including an image of the appearing object for each appearing object in a case where a plurality of the appearing objects are detected; and
   generating a background image by removing the appearing objects from the captured image,
   wherein the generating of the notification image includes superimposing each image layer on the background image in an order of detection of the appearing objects included in each image layer.

* * * * *